United States Patent [19]

Linam

[11] 4,053,097
[45] Oct. 11, 1977

[54] ARRANGEMENT FOR PLACING AND MAINTAINING REINFORCING MEMBERS IN PREDETERMINED RELATIONSHIP RELATIVE TO A WELDMENT COMPONENT

[75] Inventor: Richard L. Linam, League City, Tex.

[73] Assignee: Kelso Marine, Inc., Galveston, Tex.

[21] Appl. No.: 705,450

[22] Filed: July 15, 1976

[51] Int. Cl.² .............................................. B23K 1/14
[52] U.S. Cl. ................................. 228/44.1 R; 228/49
[58] Field of Search .................. 228/44.1, 49; 269/43, 269/73, 71, 41, 42, 37

[56] References Cited

U.S. PATENT DOCUMENTS 1,081,071  12/1913  Westland ............................. 269/43
3,650,457  3/1972  Fiegel et al. ......................... 228/44.1
3,870,853  3/1975  Reinhardt et al. ................... 228/44.1

*Primary Examiner*—Al Lawrence Smith
*Assistant Examiner*—Robert C. Watson
*Attorney, Agent, or Firm*—Jack W. Hayden

[57] ABSTRACT

Support means have connected therewith a plurality of spaced members which guide and maintain reinforcing members in position as they are welded to a weldment component. Means are associated with the support means for simultaneously moving the spaced members longitudinally of the support means and additional means are provided with each of the spaced members for independently and selectively moving them longitudinally of the support means.

6 Claims, 9 Drawing Figures

ARRANGEMENT FOR PLACING AND MAINTAINING REINFORCING MEMBERS IN PREDETERMINED RELATIONSHIP RELATIVE TO A WELDMENT COMPONENT

SUMMARY OF THE INVENTION

Various arrangements have been proposed and are in use for positioning reinforcing members relative to a weldment component such as a plate to retain the reinforcing members in a desired relationship to the plate as they are secured thereto by welding. One such form is shown in U.S. Pat. No. 3,650,457.

An object of the present invention is to provide an arrangement for guiding reinforcement members and forcing them into tight contact with a plate as they are welded to the plate which reinforcing members and welding plate move relative to the support means.

An object of the present invention is to provide an arrangement for guiding and maintaining reinforcing members in a predetermined position as they are welded to a plate which reinforcing members and welding plate move relative to a support means and wherein a plurality of spaced members are connected by suitable means to the support means with means for simultaneously moving the spaced members on the connecting means longitudinally of the support means.

An object of the present invention is to provide an arrangement for guiding and maintaining reinforcing members in a desired position as they are welded to a plate which reinforcing members and welding plate move relative to the support means and wherein a plurality of spaced members are connected by suitable means to the support means with means for simultaneously moving the spaced members on the connecting means longitudinally of the support means. Additional means are provided for moving each of the spaced members independently and selectively of each other longitudinally of the support means as desired.

An object of the present invention is to provide an arrangement for guiding reinforcing members as they are welded to a plate which reinforcing members and welding plate move relative to the support means and wherein a plurality of spaced members are connected by suitable means to the support means with means for simultaneously moving the spaced members on the connecting means longitudinally of the support means. Additional means are provided for moving each of the spaced members independently and selectively of each other longitudinally of the support means as desired and wherein the support means includes a pair of I beams for extending longitudinally and parallel to each other in spaced relation and wherein the means for simultaneously moving the spaced members includes a motor means, a pair of lead screws extending longitudinally of the support means and in spaced parallel relation to each other, shaft means connected for rotation by the motor means and extending transversely of the lead screws, spaced worm gear means mounted on said shaft means and engaged with said lead screws, additional shaft means extending transversely of the lead screws and rotatably mounted in each of the spaced members, additionally spaced worm gear means mounted on said additional shaft means and engaged with said lead screws and means carried by each of said spaced members to control rotation of said additional shaft means whereby rotation of said shaft means rotates said lead screws and simultaneously moves said spaced members therealong.

An object of the present invention is to provide an arrangement for guiding and clamping a plurality of vertically arranged, longitudinally extending and laterally spaced reinforcing members in position as they are welded to a plate moving longitudinally relative to the support means wherein the support means includes an arrangement for simultaneously moving the spaced members longitudinally of the support means and motor means in each of the spaced motor means for selectively and independently moving the spaced members relative to each other whereby the reinforcing members may be positioned on the plate in any desired laterally arranged relationship.

Other objects and advantages of the present invention will become apparent from consideration of the following description and drawings.

BRIEF DESCRIPTION OF THE PREFERRED EMBODIMENT

Figure 1:
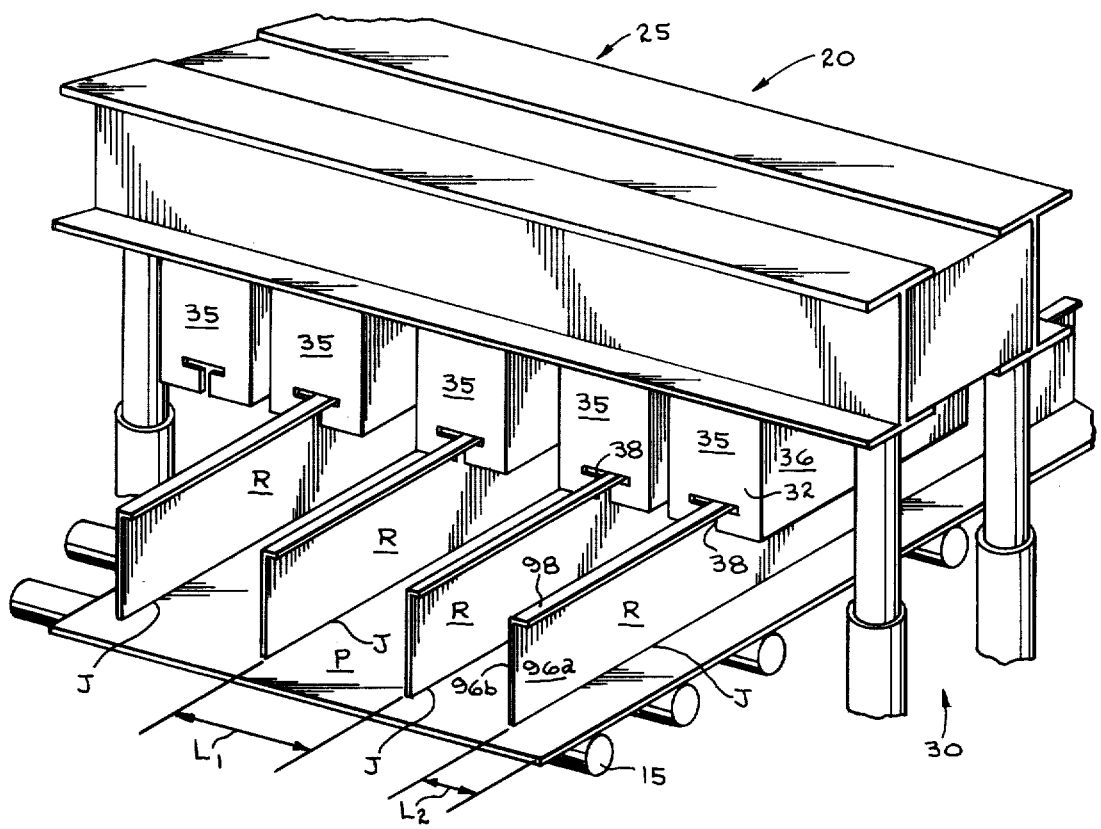
FIG. 1 is a partial isometric view of the present invention showing the support means with the spaced members depending therefrom and engaged with vertically arranged reinforcing members in contact with a plate moving relative to the support means, whereby the reinforcing means may be welded to the plate.

Attention is first directed to FIG. 1 of the drawings wherein the arrangement of the present invention is illustrated generally by the numeral 20. A support means is represented generally at 25, means to raise and lower the support means illustrated generally at 30 and spaced members movably connected or carried on the support means 25 are represented at 35. The spaced members 35 engage and guide a reinforcing member designated R each of which is vertically arranged, longitudinally extending and laterally spaced a predetermined amount as illustrated in FIG. 1 and maintained in such relationship as the reinforcing members R and the weldment component shown in the form of the plate P are moved on the roller means 15 relative to the support means 25. Welding guns (not shown) are provided for welding the plate P and the reinforcing members R together in a predetermined pattern at their juncture J.

The present invention provides an arrangement whereby the movable spaced members 35 may be moved simultaneously longitudinally of the support means 25, and they also may be selectively and independently moved relative to each other relative to support means 25 so that the lateral distance between the reinforcing members R may be varied as desired.

Figure 2:
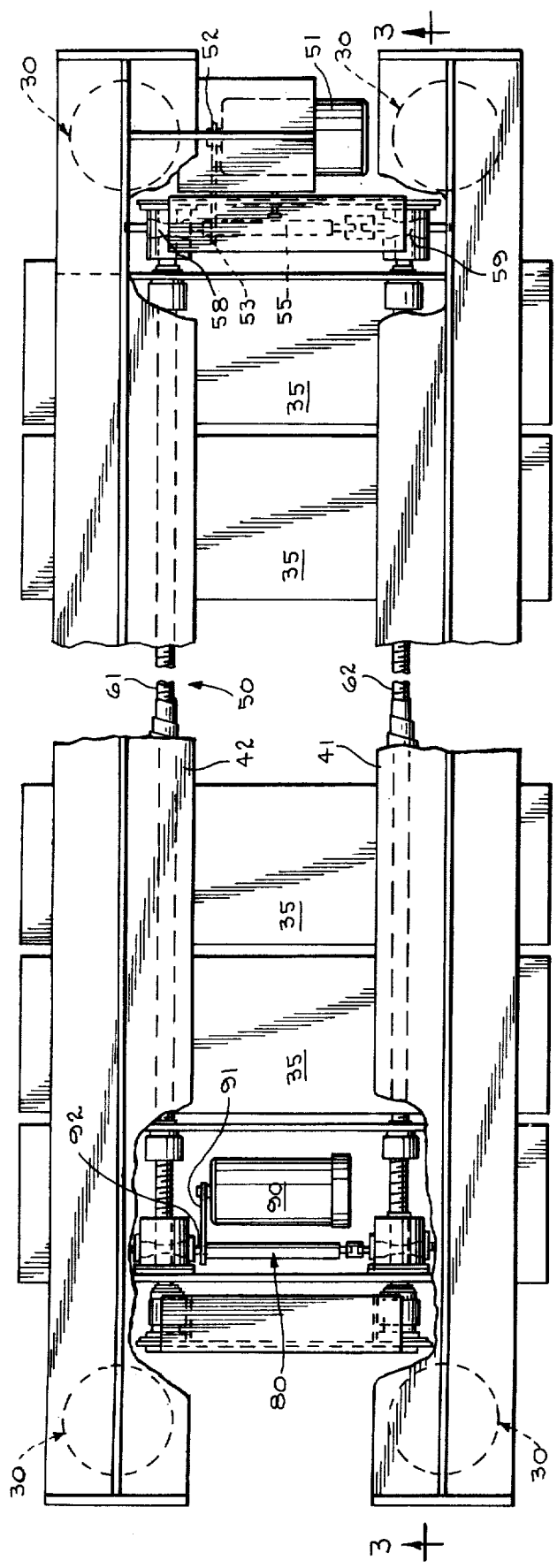
FIG. 2 is a top plan view showing the relationship of the longitudinally extending, parallel I beams which primarily form the support means.

The support means 25 is shown in greater detail in FIG. 2 and includes the longitudinally extending, spaced and parallel I beams 41 and 42. The I beams 41 and 42 are supported at each of their ends by the means 30 for the raising and lowering of the support means relative to the plate P as may be desired.

Figure 4:
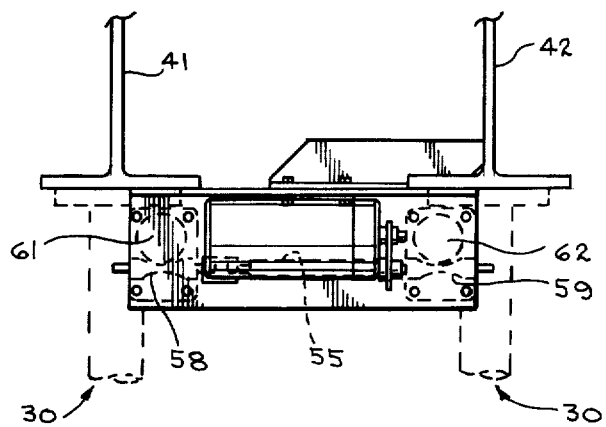
FIG. 4 is an end view on the line 4—4 of FIG. 3.

Means for simultaneously moving the members 35 along the I beams 41, 42 are represented generally at 50. The means 50 includes a motor 51 which is connected by a belt, chain or the like 52 to the pulley or sprocket 53 mounted on the end of shaft means 55 which extends transversely between the I beams 41, 42 as better seen in FIG. 2 of the drawings. Spaced worm gears 58 and 59 better seen in FIG. 4 are carried on the shaft 55 and threadedly engage the longitudinally extending lead screws 61 and 62 which extend longitudinally relative to the I beams 41, 42 and are arranged in spaced relationship as shown in the drawings. The lead screws 61 and 62 are rotatably supported by the I beams 41, 42 in any suitable manner and are connected by the arrangement referred to generally at 70 for moving each of the spaced members 35.

Figure 6:
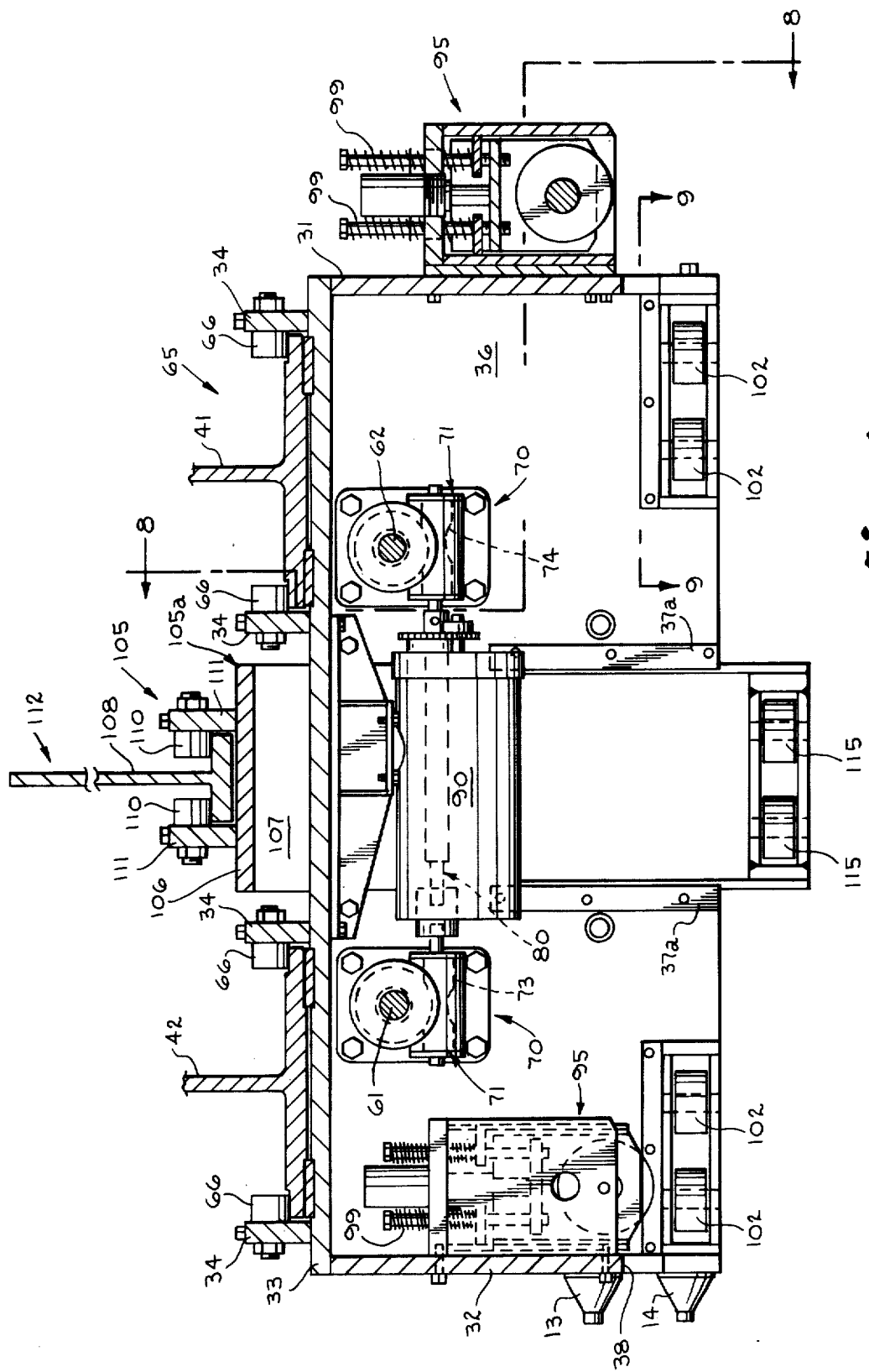
FIG. 6 is a sectional view on the line 6—6 of FIG. 5 illustrating further structural details of one of the spaced members.
Figure 7:
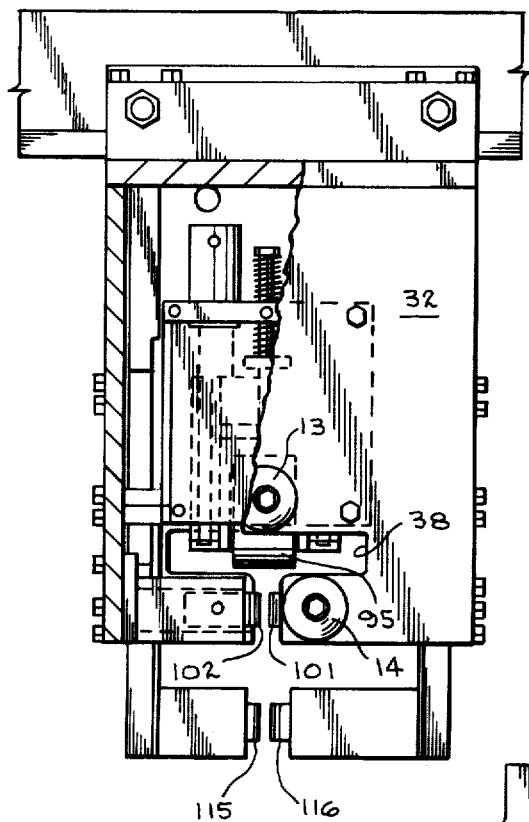
FIG. 7 is a sectional view, partly in elevation, on the line 7—7 of FIG. 5 illustrating still further details.

The means 70 is better shown in FIG. 6 of the drawings and includes shaft means 80 which extends transversely in each of the spaced members 35 and are rotatably supported thereby by any suitable means such as the bearing arrangement referred to at 71. The shaft means 80 in each spaced member 35 includes spaced worm gear means 73 and 74 which are engaged with the lead screws 61 and 62 respectively so that upon rotation of the lead screws 61 and 62 by the motor 51 and shaft 55 along with the worm gears 58 and 59 connected therewith, the shaft means 80 and the worm gears 73 and 74 are moved longitudinally of the members 61 and 62. The left hand end of FIGS. 2 and 3 as viewed in the drawings shows in greater detail a means which is provided with each of the spaced members 35 for independently and selectively effecting movement of such spaced members along the lead screws 61 and 62 relative to each other.

Such means includes a motor 90 mounted in each member 35 in any suitable manner which is operatively connected by means of the belt or chain 91 to the sprocket 92 for imparting rotation to the shaft means 80. The motor means 90 has an integral brake which functions as a control for the shaft means 80 in that it restrains rotation of the shaft means 80 when the lead screws 61 and 62 are rotated to effect simultaneous movement of the spaced members 35 along the support means 25. On the other hand, the motor means 90 also functions to impart rotation to the shaft means 80 when it is desired to effect independent movement of one of the spaced members 35 relative to any of the other members to vary the lateral spacing therebetween as may be desired.

It can be appreciated that when the motor 90 is rotated this causes the shaft 80 to rotate as well as the worm gears 73 and 74 so that the spaced member 35 in which the shaft 80 is rotating will move relative to the support means 25 and the spaced member 35.

FIG. 6 illustrates suitable connecting means shown at 65 for connecting each of the spaced members 35 to the support means 25 such connecting means being in the form of rollers 66 which are mounted on each of the spaced members 35 and which engage each of the I beams 41 and 42 to accommodate movement of the spaced members 35 therealong as better illustrated in FIG. 6 of the drawings.

The members 35 include end walls 31 and 32, side walls 36 are provided which extend between the end walls 31 and 32 and are connected therewith with any suitable means as well as being joined to the top wall 33.

The end walls 31 and 32 are provided with a slot 38 of suitable configuration for receiving the reinforcing member R therein as shown in FIG. 1 of the drawings, such slot is shown as being T-shaped.

Conically shaped guides 13 and 14 are mounted on the end wall 32 adjacent the slot 38 to aid in guiding the reinforcing member R into position into the slot. Hydraulically actuated roller means referred to at 95 are provided for engaging the upper or top edge of the reinforcing member R, which edge is represented at 98 in FIG. 1 and tend to urge the reinforcing member R into contact with the plate P as the reinforcing member R and plate P move relative to the spaced members 35 in which the reinforcing member R is guided.

The hydraulically actuated roller means 95 includes spring means 99 which retract the rollers from the edge 98 of the reinforcing member R when the hydraulic pressure is withdrawn from acting on the roller arrangement 95. The details of the hydraulic arrangement are well known in the art and description thereof is believed unnecessary to an understanding of the operation of the present invention.

Figure 9:
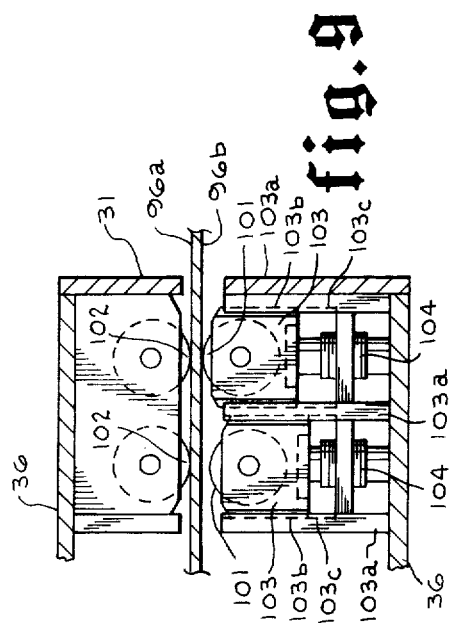
FIG. 9 is a view on the line 9—9 of FIG. 6.
Figure 8:
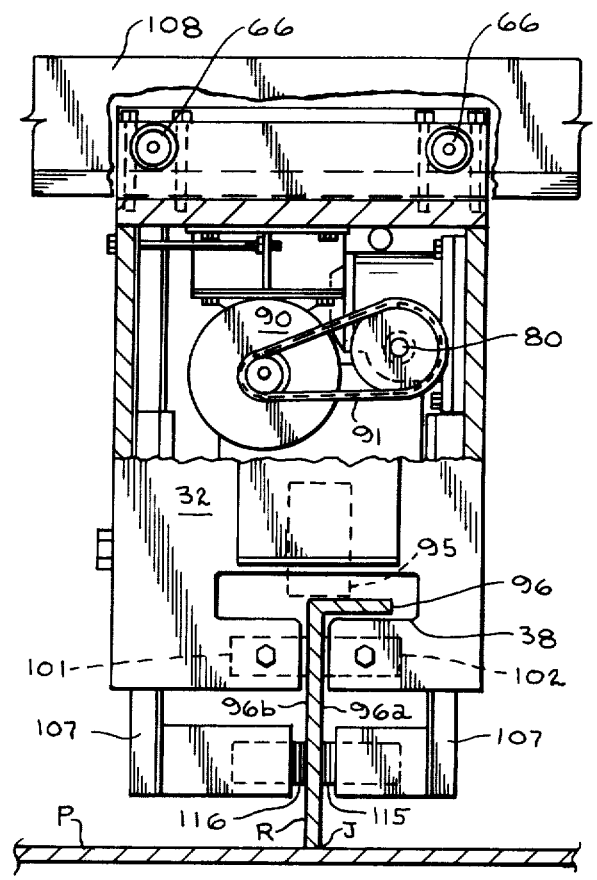
FIG. 8 is a sectional view, partly in elevation, on the line 8—8 of FIG. 6, to illustrate still further structural details.

Roller means 101 and 102 are provided for engaging each side 96a and 96b of the reinforcing member R as shown in FIG. 8 and FIG. 9 of the drawings. Roller means 102 are rotatably mounted in a fixed position within spaced members 35 and form a reference plane for locating reinforcing members R. Roller means 101 are rotatably mounted within slide means 103. Slide means 103 are supported by support means 103a and are free to move nearer or farther from roller means 102 by way of integral keys 103b which engage key ways 103c. Key ways 103c are machined into support means 103a. Hydraulic cylinder and piston means 104 are mounted adjacent to slide means 103 and when energized, force slide means 103 and roller means 101 closer to roller means 102 and consequently force the reinforcing members R into the desired positions contacting roller means 102.

The roller means 101 and 102 are mounted on the side walls 36 of each spaced member 35 as described above to accommodate rotation thereof for engaging and accommodating movement of the reinforcing member R through the spaced member 35 as the member R and plate P are welded together at their juncture J.

Figure 5:
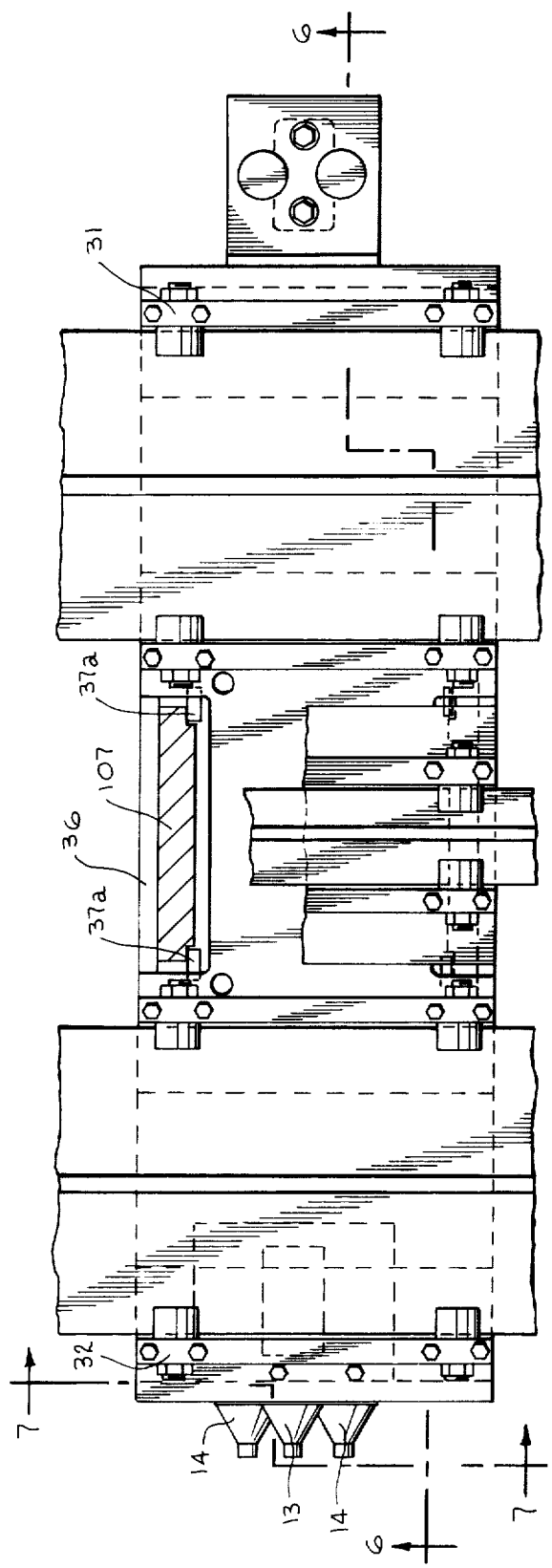
FIG. 5 is a top plan view, partly in section, of one of the spaced members to illustrate further structural details.

Guide means 37a are mounted on the inside surface of side walls 36 for slidable engagement with the centrally located movable portion referred to generally at 105. Such centrally located movable portion 105 is generally an inverted U-shaped member referred to at 105a and includes the top 106 of the U which is joined to the spaced sides 107 of the U-shaped member 105a. The sides 107 extend vertically downward and contact the guides 37a which are mounted on the vertical inside surfaces of the side plates 36 as shown in FIG. 5 of the drawings.

The centrally located movable portion 105 is supported on the I beam 108 which extends between and parallel to the I beams 41 and 42 as shown in FIG. 6, the centrally movable portion being connected to the I beam by means of the rollers 110 which are mounted on the brackets 111 extending upwardly from the top 106 of the centrally located member 105. Suitable means as represented at 112 is provided for engaging with the I beam 108 for raising and lowering of the centrally movable portion 105, such means 112 being of any suitable type such as a hydraulic cylinder and piston arrangement or the like.

While it is believed that the operation of the present invention is apparent from the foregoing description, it will be assumed that it is to be employed for guiding a plurality of vertically spaced reinforcing members R and forcing said members R into tight contact with plate P to enable such reinforcing members to be welded to the plate P as the plate P and the members R are moved relative to the support means referred to generally at 25. The means 30, which may be in the form of a hydraulic or mechanical jacking arrangement, and is initially moved vertically relative to the rollers 15 on which the plate P is to be moved so that the support means 25 and the spaced members 35 will be at a proper height for receiving the reinforcing member R in the slot 38 in each of the spaced members 35. This is determined by the height of the reinforcing members R which may vary, by way of example only, from 5 inches in height to 24 inches in height.

Figure 3:
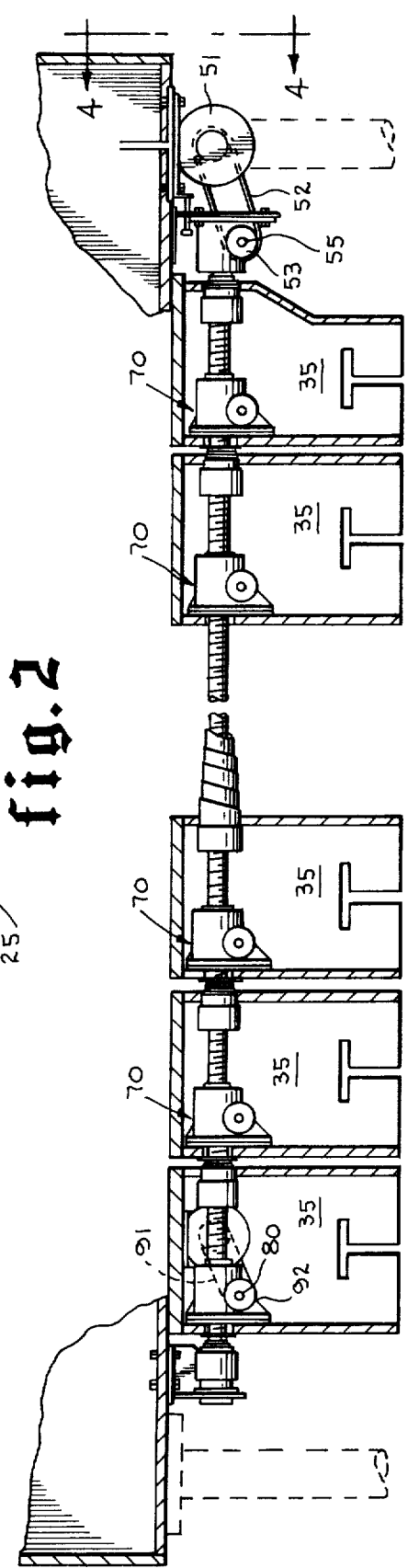
FIG. 3 is a sectional view on the line 3—3 of FIG. 2.

The reinforcing members R are positioned adjacent the end 32 and guided into the slot in the end 32 past the guides 13 and 14 so that the sides 96a and 96b thereof are engaged by the rollers 101 and 102 adjacent the end plate 32 of each member 35. The upper edge of the reinforcing member R represented at 98 will be engaged by the roller arrangement 95 and as the reinforcing member R continues to move through the member 35 in which it is positioned, it will be eventually engaged by the rollers 101 and 102 adjacent the end wall 31 and the upper edge 98 will be engaged by the roller arrangement 95 adjacent the end wall 31 so as to urge the reinforcing member R toward the plate P and into engagement therewith at their juncture J. After all of the reinforcing members R have been positioned in the spaced members 35, the spaced members 35 may be moved laterally of the support means 25 by means of the motor 51, worm gears 58 and 59 and jack shafts 61 and 62 as shown in FIGS. 2, 3 and 4. Rotation of the jack shafts 61 and 62 causes the members 35 to move laterally in unison relative to the support means 25 since the rotating jack screws 60 and 61 will cause the worm gears 73, 74 in each of the members 35 and the shaft 80 to move along the jack screws 61, 62. At this time the motor 90 prevents rotation of the shaft 80 so that such lateral movement of each of the members 35 is effected.

Thereafter, if it is desired to space the reinforcing members R in a predetermined lateral relationship as illustrated at L1 and L2 in FIG. 1, the members 35 may be individually actuated by the motor 90 so as to rotate the shaft 80 and the worm gears 73 and 74 to move along 61, 62 and effect movement of any desired spaced member 35 laterally relative to the support means 25 and the other spaced members 35.

It can be appreciated that a suitable control panel and power source is provided for actuating the motor 51 as well as each of the motors 90 in each of the spaced members 35. However, it is believed that any person skilled in the art can appreciate and understand the arrangement of a power source, such as a source of electrical energy and a wiring arrangement for supplying and controlling power to each of the motors 90 as well as to the motor 51.

Similarly, the hydraulic supply source for the means 30 as well as the means 112, means 95 and means 104 is well known in the art and the details of the construction and function thereof are believed unnecessary.

Auxiliary roller means represented at 115 are provided adjacent the lower edge of each of the plates 107 for engaging the sides 96a and 96b at the reinforcing member R where the reinforcing member R is of substantial height so as to require additional contact with roller means to provide stability therefor.

The mounting arrangement of roller means 115, 116 on plates 107 is similar to that described with regard to roller means 101, 102 respectively to assure that reinforcing member R is maintained in contact between such roller means 115, 116 on central movable portion 105.

The foregoing disclosure and description of the invention are illustrative and explanatory thereof, and various changes in the size, shape, and materials as well as in the details of the illustrated construction may be made without departing from the spirit of the invention.

What is claimed is:

1. An arrangement for supporting reinforcing members as they are welded to a plate including:
   a. support means including a pair of I beams extending longitudinally and parallel to each other in spaced relation;
   b. a plurality of spaced members to guide and support the reinforcing members as they are welded to the plate;
   c. means connecting said members to said support means;
   d. means for simultaneously moving said spaced members on said connecting means longitudinally of said support means including:
      1. motor means;
      2. a pair of lead screws extending longitudinally of said support means and in spaced, parallel relation to each other;
      3. shaft means connected for rotation by said motor means extending transversely of said lead screws;
      4. spaced worm gear means mounted on said shaft means and engaged with said lead screws;
      5. additional shaft means extending transversely of said lead screws and rotatably mounted in each of said spaced members;
      6. additional spaced worm gear means mounted on said additional shaft means and engaged with said lead screws;
      7. control means carried by each of said spaced members to control rotation of said additional shaft means whereby rotation of said shaft means rotates said lead screws and simultaneously moves said spaced members therealong; and
   e. additional means moving said spaced members independently of each other longitudinally of said support means.

2. The invention of claim 1 including means to raise and lower said support means to accommodate reinforcing members of varying height in said spaced members.

3. The invention of claim 1 wherein said control means includes additional motor means carried by each of said spaced members and operatively connected to rotate said additional shaft means whereby said spaced members may be selectively moved along said lead screws independently of each other.

4. The invention of claim 1 wherein each of said spaced members include:

1. roller means for engaging each side of the reinforcing members;
2. additional roller means for engaging the top edge of said reinforcing members to urge the reinforcing members into contact with the plate to which they are to be welded;
3. a centrally located movable portion;
4. means supporting said movable portion for movement up and down relative to said spaced member; and
5. auxiliary roller means mounted on said movable portion for engaging with a reinforcing member.

5. The invention of claim 1 wherein said connecting means includes roller means mounted on each of said spaced members and engaging said I beams to accommodate movement of said spaced members therealong.

6. The invention of claim 4 including:
a. additional I beam means extending longitudinally of and between said pair of I beams;
b. roller means mounted on said centrally located movable portion of said spaced members and engaged with said additional I beam means to accommodate movement therealong; and
c. means to move said additional I beam means toward and away from each of said spaced members.

* * * * *